US008307173B2

(12) United States Patent
McKenney

(10) Patent No.: US 8,307,173 B2
(45) Date of Patent: Nov. 6, 2012

(54) HIGH PERFORMANCE REAL-TIME READ-COPY UPDATE

(75) Inventor: Paul E. McKenney, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/371,551

(22) Filed: Feb. 13, 2012

(65) Prior Publication Data
US 2012/0144129 A1 Jun. 7, 2012

Related U.S. Application Data

(62) Division of application No. 12/553,006, filed on Sep. 2, 2009, now Pat. No. 8,185,704.

(51) Int. Cl.
G06F 12/12 (2006.01)

(52) U.S. Cl. . 711/156; 711/153; 711/159; 711/E12.044; 707/704; 707/E17.032; 707/E17.044

(58) Field of Classification Search .................. 711/156, 711/152, 153, 159; 707/704
See application file for complete search history.

(56) References Cited

U.S. PATENT DOCUMENTS

| 5,442,758 | A | 8/1995 | Slingwine et al. |
| 5,608,893 | A | 3/1997 | Slingwine et al. |
| 5,727,209 | A | 3/1998 | Slingwine et al. |
| 6,219,690 | B1 | 4/2001 | Slingwine et al. |
| 6,886,162 | B1 | 4/2005 | McKenney |
| 6,996,812 | B2 | 2/2006 | McKenney |
| 7,287,135 | B2 | 10/2007 | McKenney et al. |
| 7,353,346 | B2 | 4/2008 | McKenney et al. |
| 2005/0149634 | A1 | 7/2005 | McKenney |
| 2005/0198030 | A1 | 9/2005 | McKenney |
| 2006/0100996 | A1 | 5/2006 | McKenney |
| 2006/0112121 | A1 | 5/2006 | McKenney et al. |
| 2006/0117072 | A1 | 6/2006 | McKenney |
| 2006/0123100 | A1 | 6/2006 | McKenney |
| 2006/0130061 | A1* | 6/2006 | Bauer et al. .................. 718/100 |
| 2006/0265373 | A1 | 11/2006 | McKenney et al. |
| 2007/0061372 | A1* | 3/2007 | Appavoo et al. .............. 707/200 |
| 2007/0083565 | A1 | 4/2007 | McKenney |
| 2007/0101071 | A1 | 5/2007 | McKenney |
| 2007/0198520 | A1 | 8/2007 | McKenney et al. |

(Continued)

OTHER PUBLICATIONS

J. Seigh, "RCU + SMR for preemptive kernel/user threads," Linux Kernel Mailing List, May 9, 2005, 2 pages.

(Continued)

Primary Examiner — Kenneth Lo
(74) Attorney, Agent, or Firm — Walter W. Duft

(57) ABSTRACT

A technique for reducing reader overhead when referencing a shared data element while facilitating realtime-safe detection of a grace period for deferring destruction of the shared data element. The grace period is determined by a condition in which all readers that are capable of referencing the shared data element have reached a quiescent state subsequent to a request for a quiescent state. Common case local quiescent state tracking may be performed using only local per-reader state information for all readers that have not blocked while in a read-side critical section in which the data element is referenced. Uncommon case non-local quiescent state tracking may be performed using non-local multi-reader state information for all readers that have blocked while in their read-side critical section. The common case local quiescent state tracking requires less processing overhead than the uncommon case non-local quiescent state tracking.

18 Claims, 11 Drawing Sheets

U.S. PATENT DOCUMENTS

| | | | |
|---|---|---|---|
| 2007/0226440 | A1 | 9/2007 | McKenney et al. |
| 2007/0266209 | A1 | 11/2007 | McKenney et al. |
| 2008/0033952 | A1 | 2/2008 | McKenney et al. |
| 2008/0040720 | A1 | 2/2008 | McKenney et al. |
| 2008/0082532 | A1* | 4/2008 | McKenney .................. 707/8 |
| 2008/0140951 | A1 | 6/2008 | McKenney et al. |
| 2008/0177742 | A1 | 7/2008 | McKenney et al. |
| 2008/0215784 | A1 | 9/2008 | McKenney |
| 2008/0229309 | A1 | 9/2008 | McKenney |
| 2008/0288749 | A1 | 11/2008 | McKenney et al. |
| 2008/0313238 | A1 | 12/2008 | McKenney et al. |
| 2008/0320262 | A1 | 12/2008 | McKenney et al. |
| 2009/0006403 | A1 | 1/2009 | McKenney |
| 2009/0077080 | A1 | 3/2009 | McKenney |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Llnux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN.net, Oct. 1, 2006, 6 pages.

P. Mckenney, "Sleepable RCU", LWN.net, Oct. 9, 2006, 10 pages.

O. Nesterov, "cpufreq_tsc() as core_initcall_sync", LKML.org, Nov. 19, 2006, 2 pages.

P. McKenney, "Using RCU in the Linux 2.5 Kernel", Kernel Korner, Oct. 1, 2003, 11 pages.

A. Kleen, "How to do nothing efficiently or better laziness: No Idle tick on x86-64", 2005, 16 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney et al., "Introducing Technology Into the Linux Kernel: A Case Study," Aug. 7, 2008, 14 pages.

P. McKenney, "Is Parallel Programming Hard, and, If So, What Can You Do About It," Mar. 8, 2000, 146 pages.

P. McKenney, "Re: [fwd: Re: [patch] real-time preemption, -rt-2.6.13-rc4-v0.7.52-01]," Aug. 8, 2005, 15 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

\* cited by examiner

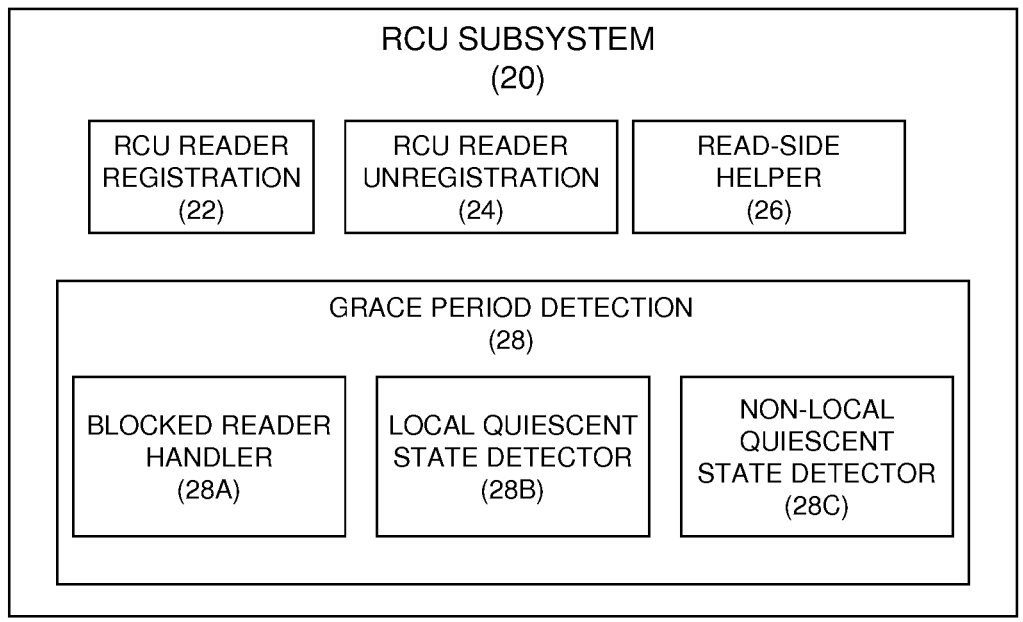
*FIG. 5*
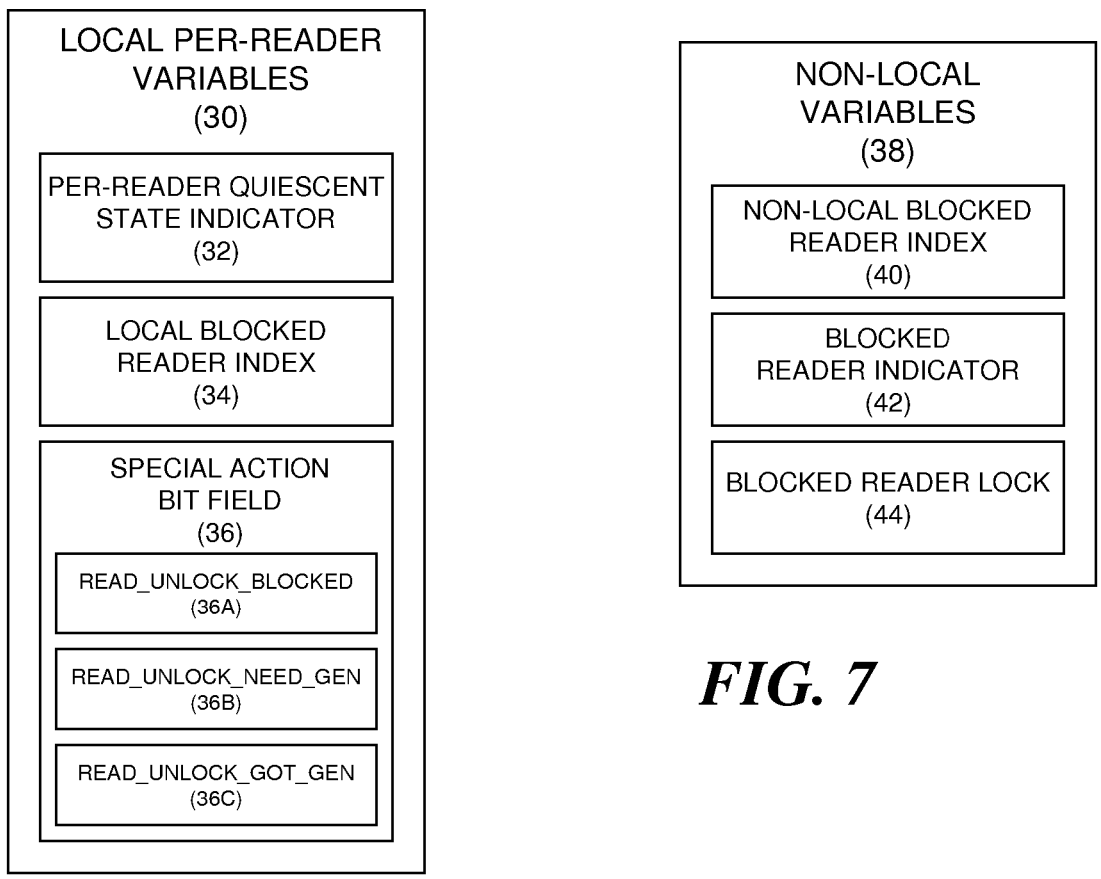
*FIG. 6*
*FIG. 7*

HIGH PERFORMANCE REAL-TIME READ-COPY UPDATE

This application is a divisional under 35 U.S.C. 120 of application Ser. No. 12/553,006, filed Sep. 2, 2009, entitled "High Performance Real-Time Read-Copy Update."

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a preemptive real-time computing environment.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data. The second-phase update operation typically comprises freeing a stale data element. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to synchronize with other updaters), allocating new memory for B', copying the contents of B to B', modifying B' as needed, updating the pointer from A to B so that it points to B', and releasing the lock. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running tasks (e.g., processes, threads, or other execution contexts) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU (as can other operations that will not be listed here).

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period. One technique is to accumulate deferred update requests as callbacks (e.g., on callback lists), then perform batch callback processing at the end of the grace period. This represents asynchronous grace period processing. Updaters can perform first phase updates, issue callback requests, then resume operations with the knowledge that their callbacks will eventually be processed at the end of a grace period. Another commonly used technique is to have updaters perform first phase updates, block (wait) until a grace period has completed, and then resume to perform the deferred updates. This represents synchronous grace period processing.

Read-copy update has been used in production for many years in various operating system kernel environments, including the Linux® kernel. In non-preemptible kernels, grace period detection processing can be performed by observing natural quiescent states (e.g., context switch, user mode or idle loop) or by inducing such states (e.g., by forcing a context switch). In preemptible kernels, an executing RCU reader can be preempted by a higher priority task. Such preemption may occur even while the reader is in a kernel mode critical section referencing RCU-protected data elements. Although reader preemption represents a context switch, it may not be validly used for grace period detection. For that reason, RCU versions designed for preemptible environments (hereinafter "preemptible RCU") do not rely on natural quiescent states. Instead, readers define their own quiescent states by registering and unregistering for RCU read-side critical section processing as they respectively enter and leave RCU read-side critical sections.

A technique used in existing versions of preemptible RCU for registering and unregistering readers for RCU read-side critical section processing is to provide a pair of per-processor counters and an index for identifying which counter of each pair is associated with a particular grace period. A reader registers for RCU read-side critical section processing by incrementing the currently indexed counter associated with the reader's processor. The reader then unregisters by decrementing the same indexed counter on the original processor, or on whatever processor the reader happens to be running when it exits the critical section. A modulo counting scheme may be used to determine when all of the counters indexed to a particular grace period have been collectively decremented to zero.

A grace period is determined to expire in a preemptible RCU environment when all readers that registered after the beginning of the grace period have subsequently unregistered. The grace period detection effort requires coordination with the various processors that may be running RCU readers. Readers need to know when the grace period detection logic commences new grace periods, and the grace period detection logic need to be certain that readers have exited their RCU read-side critical sections before declaring the end of old grace periods. Due in large part to CPU and/or compiler optimizations that allow memory accesses to be performed out of order, the coordination effort required for preemptible RCU grace period detection can be significant. For example, readers may have to implement atomic instructions, memory barriers and other high-overhead operations when registering and unregistering for RCU read-side critical section processing. One solution is to shift some of the reader overhead burden to the RCU grace period detection logic. This has been practiced in real-time versions of the Linux® kernel by using a state machine to coordinate grace period detection with the readers. However, there is still read-side overhead due to the reader registration/unregistration primitives each implementing interrupt disable/restore instructions. Moreover, the grace period latency imposed by the state machine is not insignificant.

SUMMARY

A technique is provided for reducing reader overhead when referencing a shared data element while facilitating realtime-safe detection of a grace period for deferring destruction of the shared data element. The grace period is determined by a condition in which all readers that are capable of referencing the shared data element have reached a quiescent state subsequent to a request for a quiescent state. Common case local quiescent state tracking may be performed using only local per-reader state information for all readers that have not blocked while in a read-side critical section in which the data element is referenced. Uncommon case non-local quiescent state tracking may be performed using non-local multi-reader state information for all readers that have blocked while in their critical section. The common case local quiescent state tracking requires less processing overhead than the uncommon case non-local quiescent state tracking.

BRIEF DESCRIPTION OF THE DRAWINGS

The foregoing and other features and advantages of the invention will be apparent from the following more particular description of example embodiments, as illustrated in the accompanying Drawings, in which:

FIG. 5 is a functional block diagram showing functional components of the RCU subsystem of FIG. 4;

FIG. 6 is a diagrammatic illustration of per-reader data variables that may be stored in the memory of the computing system of FIG. 4;

FIG. 7 is a diagrammatic illustration of non-local variables that may be stored in the memory of the computing system of FIG. 4;

DETAILED DESCRIPTION OF EXAMPLE EMBODIMENTS

Figure 1A:
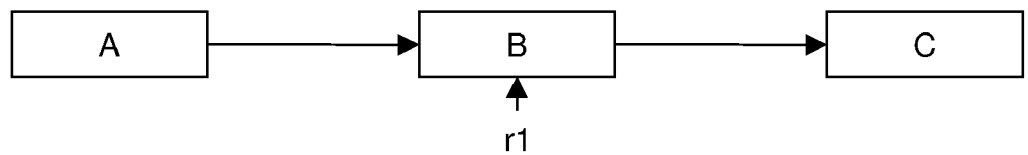
FIGS. 1A-1D are diagrammatic representations of a linked list of data elements undergoing a data element replacement according to a conventional read-copy update mechanism.
Figure 1B:
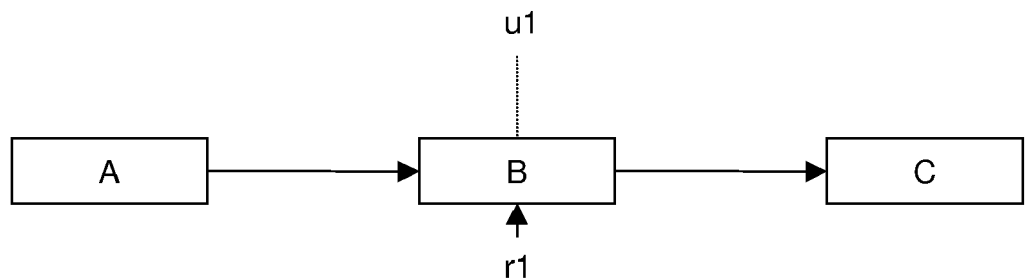
Figure 1C:
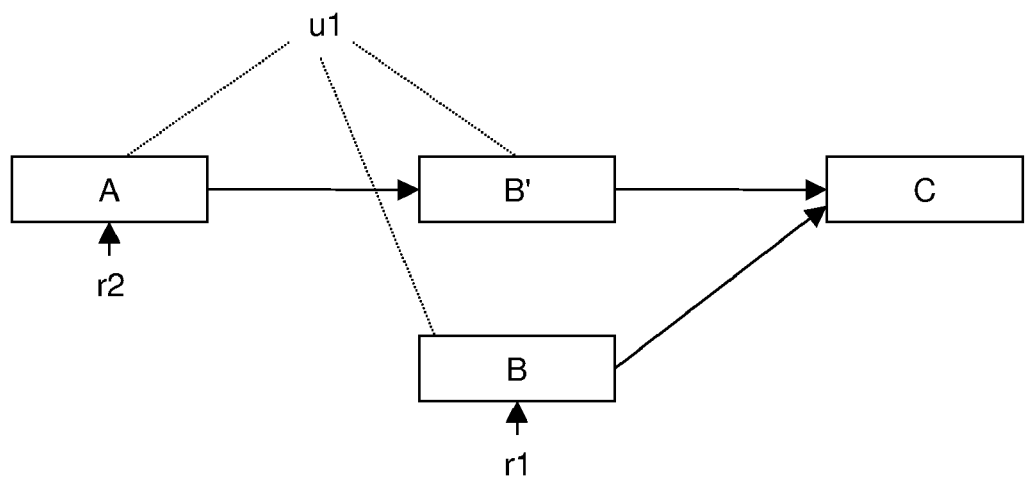
Figure 1D:
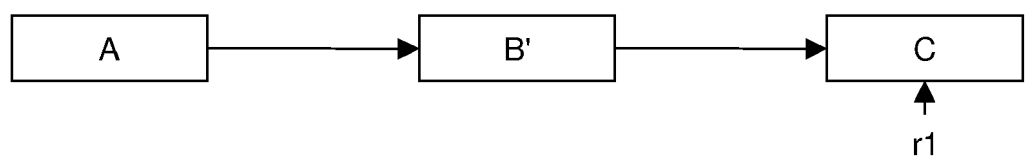
Figure 2A:
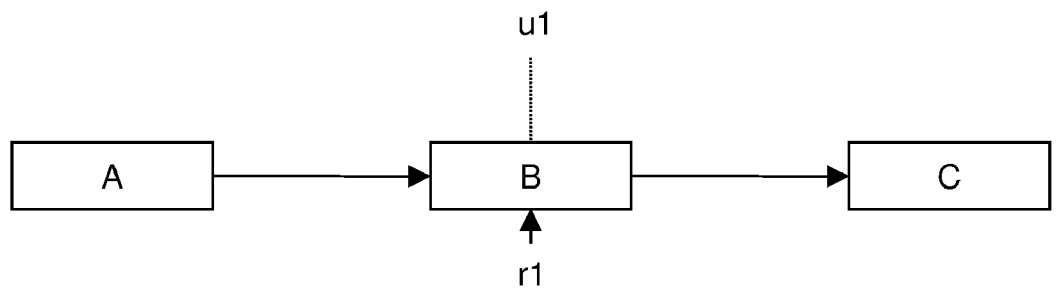
FIGS. 2A-2C are diagrammatic representations of a linked list of data elements undergoing a data element deletion according to a conventional read-copy update mechanism.
Figure 2B:
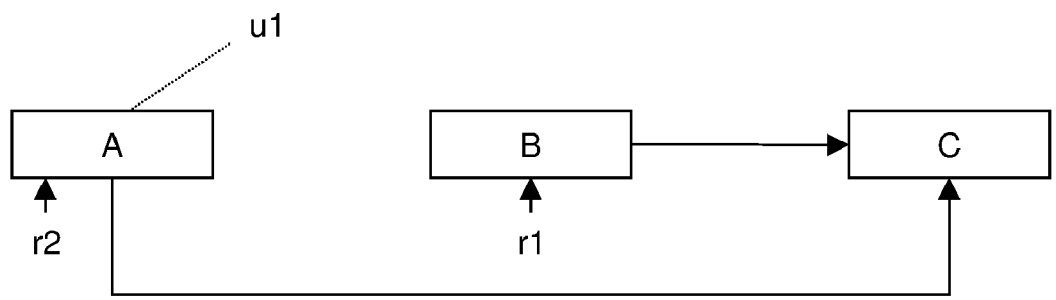
Figure 2C:
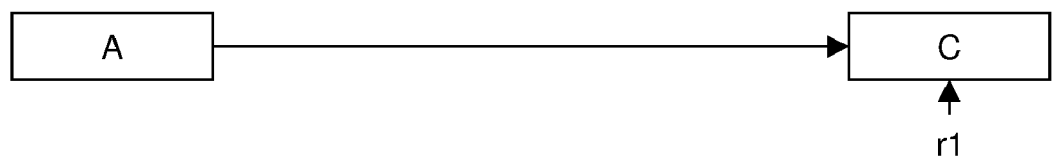
Figure 3:
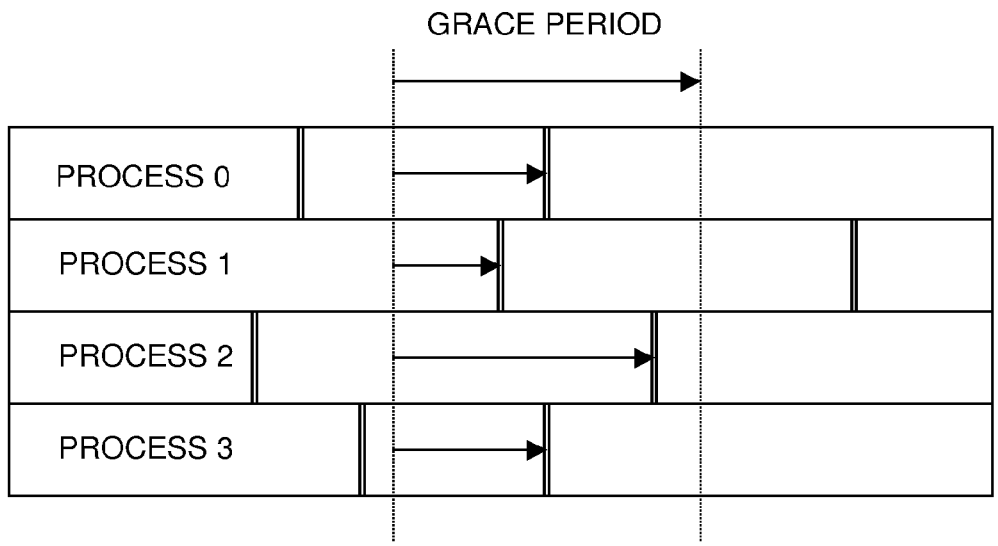
FIG. 3 is a flow diagram illustrating a grace period in which four processes pass through a quiescent state.
Figure 4:
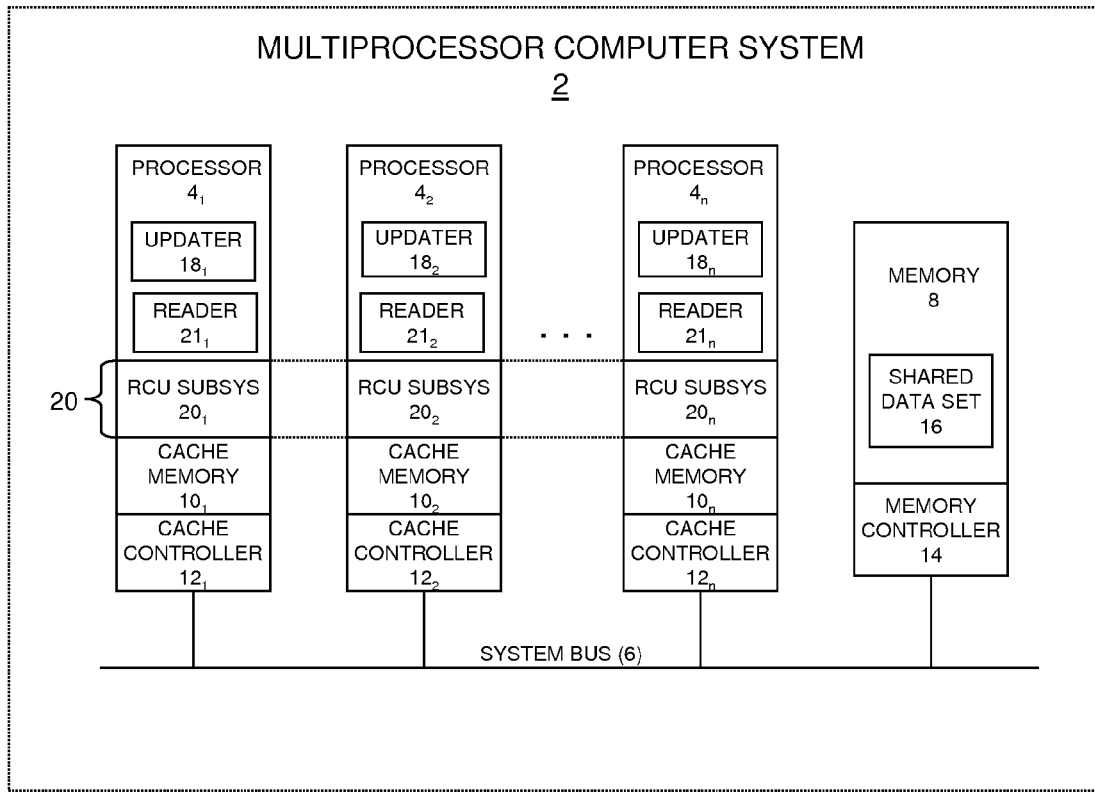
FIG. 4 is a functional block diagram showing a computing system that implements data readers, data updaters and an RCU subsystem that may be constructed in accordance with the present disclosure.

Turning now to the figures, wherein like reference numerals represent like elements in all of the several views, FIG. 4 illustrates an example computing environment in which the disclosed embodiments may be implemented. In particular, a multiprocessor computing system 2 is shown in which two or more processors 4 (e.g., $4_1, 4_2 \ldots 4_n$) are connected by way of a system bus 6 to a memory 8. As used herein, "processors" refers to CPUs (Central Processing Units) within single-core or multi-core (each core being considered a CPU) processing devices that execute program instruction logic, such as software or firmware. Such processing devices may be used in general purpose computers, special purpose computers, portable computing, communication and/or media player devices, set-top devices, embedded systems, to name but a few. The memory 8 may comprise any type of storage medium capable of storing data in computer readable form. The processors 4 and the memory 8 may be situated within a single computing node (e.g., as part of a single-node SMP system) or they may be distributed over plural nodes (e.g., as part of a NUMA system or cluster). Conventional cache memories 10 (e.g., $10_1, 10_2 \ldots 10_n$) and cache controllers 12 (e.g., $12_1, 12_2 \ldots 12_n$) may be respectively associated with the processors 4. A conventional memory controller 14 is associated with the memory 8. The memory controller 14 may be integrated with the processors 4 or provided separately therefrom (e.g. as part of a chip set).

It is assumed in FIG. 4 that update operations executed within operating system kernel-level tasks (e.g., processes, threads or other execution contexts) will periodically perform updates on a set of shared data 16 stored in the memory 8. Reference numerals $18_1, 18_2 \ldots 18_n$ illustrate individual update operations (updaters) that may periodically execute on the processors 4 from program instructions stored in the memory 8. As previously described in the section entitled "Background of the Invention," the updates performed by the data updaters 18 can include modifying elements of a linked list, inserting new elements into the list, deleting elements from the list, and many other types of operations (involving lists or other data structures). To facilitate such updates, the processors 4 are programmed to implement a read-copy update (RCU) subsystem 20 as part of their operating system kernel-level functions. The RCU subsystem 20 comprises RCU subsystem instances $20_1, 20_2 \ldots 20_n$ that periodically execute on the processors 4 from program instructions stored in the memory 8. The processor 4 also periodically executes operating system kernel-level read operations (readers) $21_1, 21_2 \ldots 21_n$ from program instructions stored in the memory 8. The readers reference the shared data 16 for reading. Such read operations will typically be performed far more often than updates, insofar as this is one of the premises underlying the use of read-copy update. Moreover, it is possible for several of the readers 21 to maintain simultaneous references to one of the shared data elements 16 while an updater 18 updates the same data element. The updaters 18 and the readers 21 are further assumed to be preemptible so that the system 2 can support real-time operations.

During run time, an updater 18 will occasionally perform an update to a data element of the shared data 16. In accordance the philosophy of RCU, this update is performed in a manner (first-phase data update) that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view (second-phase update), or it may block until a grace period has elapsed and then perform the second-phase update itself.

As further described in the section entitled "Background of the Invention," existing preemptible RCU implementations require coordination between readers and grace period detection processing. This coordination effort imposes overhead on readers due to read-side primitives such as rcu_read_lock( ) and rcu_read_unlock( ). The former allows readers to "register" for read-side critical section processing as they enter an RCU-protected critical section and the latter allows readers to "unregister" from read-side critical section processing as they leave an RCU-protected critical section. These primitives facilitate quiescent state tracking and protect readers from premature grace period termination. Readers are deemed to be quiescent only if they are not operating within any code section demarcated by the calls to rcu_read_lock( ) and rcu_read_unlock( ) i.e., when they are not in a read-side critical section referencing RCU-protected data. Existing preemptible RCU implementations, particularly those that use a grace period detection state machine, can also require each processor that performs grace period detection to spend significant time waiting for other processors to take certain grace period detection actions (although such processors are free to do other things while waiting).

As will now be described, it is possible to provide a production-quality RCU implementation having both read-side and update-side performance comparable to that of non-preemptible RCU implementations. In particular, it is possible to have read-side primitives that require neither atomic instructions, memory barriers, preemption disabling, nor interrupt disabling in the common case where the readers do not preempt or otherwise block while in their RCU read-side critical sections. Reader locks are also not required insofar as the avoidance of reader-writer locking is one of the motivations for using RCU. The read-side primitives also require no loops, so that a sharply bounded sequence of instructions may be executed. The proposed solution is to track the currently running readers using only local per-reader state information for the non-blocking common case. When a currently running reader is found to be quiescent, the processor on which the reader is running is designated to be quiescent. The designation can be made in an RCU control block, in a hierarchical RCU state structure, or in any other summary of processor activity. This may be referred to as "local" or "first-level" quiescent state detection. In the uncommon case where a reader blocks within an RCU read-side critical section, a shift is made to a non-local (per-CPU, per-CPU-group, or global) tracking scheme using non-local multi-reader state information to determine when the blocked readers have quiesced. This may be referred to as "non-local" or "second-level" quiescent state detection. As in other RCU implementations, a grace period is determined by a condition in which all readers that are capable of referencing a shared data element have reached a quiescent state subsequent to a request for a quiescent state being made. Advantageously, local quiescent state detection requires less processing overhead (for both itself and for readers) than non-local quiescent state detection. The RCU reader unregistration primitive used to support non-local quiescent state detection may be considered to be relatively heavyweight compared to that of its counterpart used to support local quiescent state detection. However, it can be quite lightweight compared to the context switch associated with the task's blocking. Because the shift to non-local quiescent state detection is rare, it is acceptable for this non-local tracking scheme to use atomic operations, memory barriers, or even locks.

Turning now to FIG. 5, example components of the RCU subsystem 20 are shown. These components include an RCU reader registration component 22, an RCU reader unregistration component 24, and a read-side helper component 26. A grace period detection component 28 is also provided that includes a blocked reader handler 28A, a local quiescent state detector 28B and a non-local quiescent state detector 28C. Details of each of the foregoing components are discussed in more detail below. The RCU subsystem 20 also utilizes two different types of variables, namely, a set of local per-reader variables and a set of non-local variables.

Turning now to FIG. 6, a set of local per-reader variables 30 is maintained by each of the readers 21, such as in their task structures (e.g., struct task_struct in the Linux® kernel). The local variables 30 may include a quiescent state indicator 32, a blocked reader index 34, and a special action bit field 36. The local quiescent state indicator 32 is manipulated by readers as they enter and leave their RCU read-side critical sections as part of local quiescent state detection. A variable name such as "rcu_read_lock_nesting" may be used when coding the local quiescent state indicator 32 in software. This variable may be implemented as a counter that is incremented by the RCU reader registration component 22 and decremented by the RCU reader unregistration component 24 as readers respectively enter and leave their RCU read-side critical sections. One advantage of using a counter as the local quiescent state indicator 32 is that it can maintain a reader nesting count when RCU read-side critical sections are nested. Other data types could also be used.

The local blocked reader index 34 is used to record a local snapshot of a corresponding non-local blocked reader index (see reference number 40 of FIG. 7, discussed below) when a reader requires non-local quiescent state tracking (see below). A variable name such as "rcu_blocked_idx" or "rcu_preempted_idx" may be used when coding the local blocked reader index 34 in software. This variable may be implemented as an integer or other suitable data type.

The special action bit field 36 contains flags (bits) corresponding to special actions that a reader 21 should take. A variable name such as "rcu_read_unlock_special" may be used when coding the special action bit field 36 in software. The read_unlock_blocked flag 36A is set by the blocked reader handler 28A to advise a reader 21 that it blocked while in an RCU read-side critical section, thereby requiring the reader to switch to non-local quiescent state tracking. The read_unlock_need_gen flag 36B and the read_unlock_got_gen flag 36C are optional. They may be provided to handle a theoretical problem wherein a given processor 4 is always in an RCU read-side critical section whenever the local quiescent state detector 28B samples it. Should this "bad luck" situation arise, the local quiescent state detector 28B could set the read_unlock_need_gen flag 36B. This will cause the RCU reader unregistration component 24 to indicate the end of the next RCU read-side critical section by setting the read_unlock_got_gen flag 36C. It will be appreciated that there are many other ways to obtain the same effect.

Turning now to FIG. 7, a set of non-local variables 38 can be maintained for each processor 4, for groups of such processors, or globally for all of the processors in the system 2. For ease of description, FIG. 7 illustrates a single set of the non-local variables 38 based on a global scenario. The non-local variables 38 may include a non-local blocked reader index 40, a blocked reader indicator 42, and a blocked reader lock 44.

The non-local blocked reader index 40 may be used when the blocked reader indicator 42 is implemented as a two-counter array ("counter 0" and "counter 1") or other indexed data structure that is manipulated on behalf of blocked readers as part of non-local quiescent state detection. A variable name such as "rcu_blocked_readers_idx" or "rcu_preempted_readers_idx" may be used when coding the non-local blocked reader index 40 in software. A variable name such as "rcu_blocked_readers[2]" or "rcu_preempted_readers[2]" may be used when coding the blocked reader indicator 42 as an array in software. In accordance with existing preemptible RCU implementations, the non-local blocked reader index 40 acts as a counter selector that identifies which of the counters of the blocked reader indicator 42 should be assigned to a particular grace period. The non-local blocked reader index 40 may be implemented as an integer (or other suitable data type) that is incremented by the grace period detection component 28 with each new grace period. The least significant bit of the non-local blocked reader index 40 will thus toggle between "0" and "1," allowing it to serve as a counter selector for the blocked reader indicator 42.

The blocked reader lock 44 is a lock that protects the non-local variables 38, as well as the special action bit field 36 for each reader 21 running on processors 4 covered by this lock. A variable name such as "rcu_blocked_lock" or "rcu_preempted_lock" may be used when coding the blocked reader lock 44 in software. In the non-global case, it may be necessary to prevent reader migration when acquiring the blocked reader lock 44 in preparation for manipulating a reader's local variables 30, for example, by acquiring the relevant runqueue lock, disabling interrupts or disabling preemption.

Figure 8:
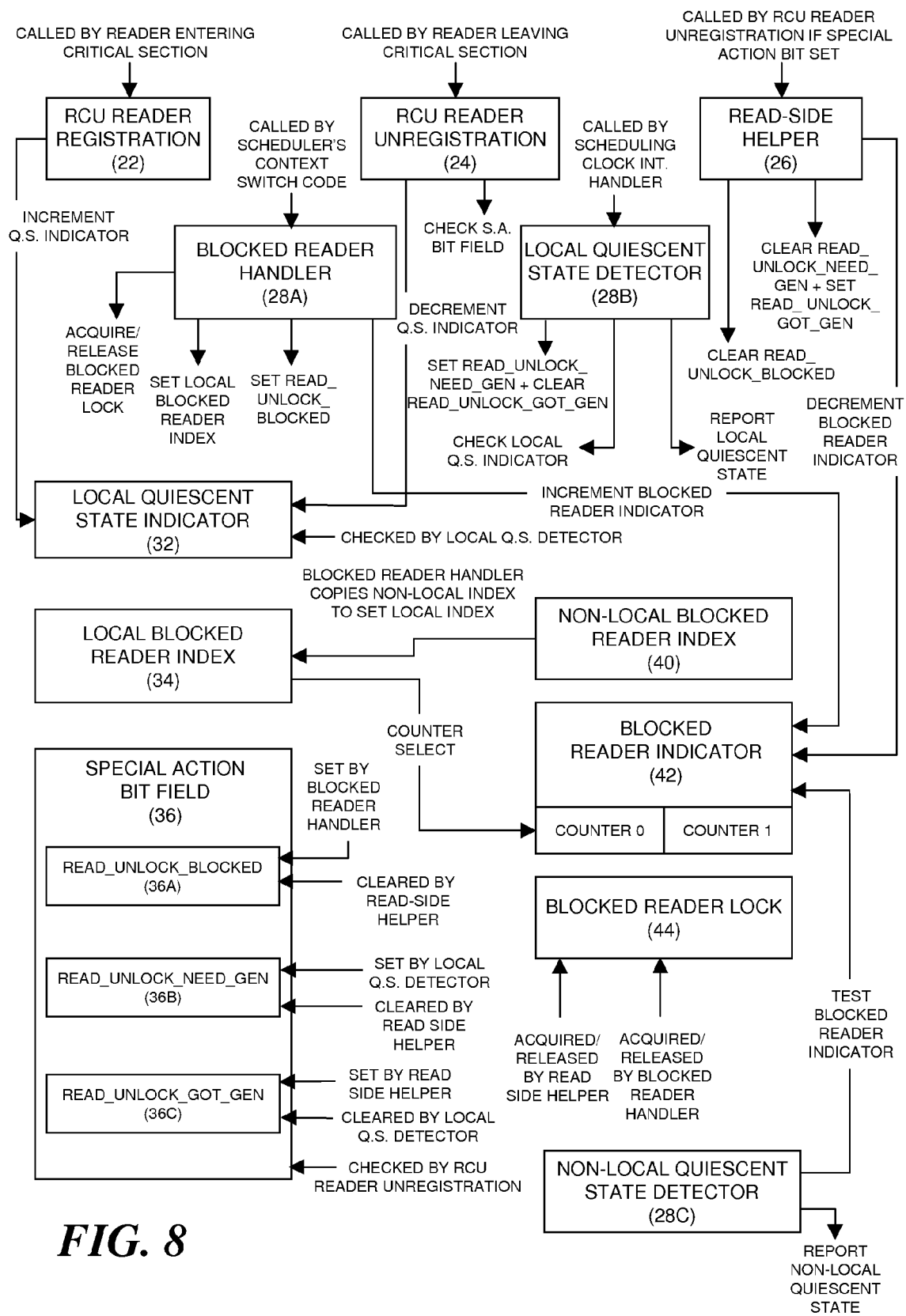
FIG. 8 is a functional block diagram representing a reference map showing operational inter-relationships between the functional components and variables shown in FIGS. 5-7.
Figure 9:
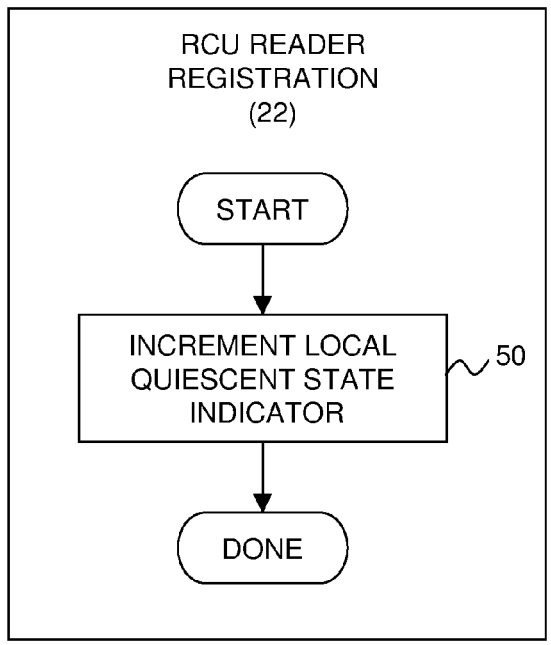
FIG. 9 is a flow diagram illustrating operations that may be performed by an RCU reader registration component of the RCU subsystem.
Figure 10:
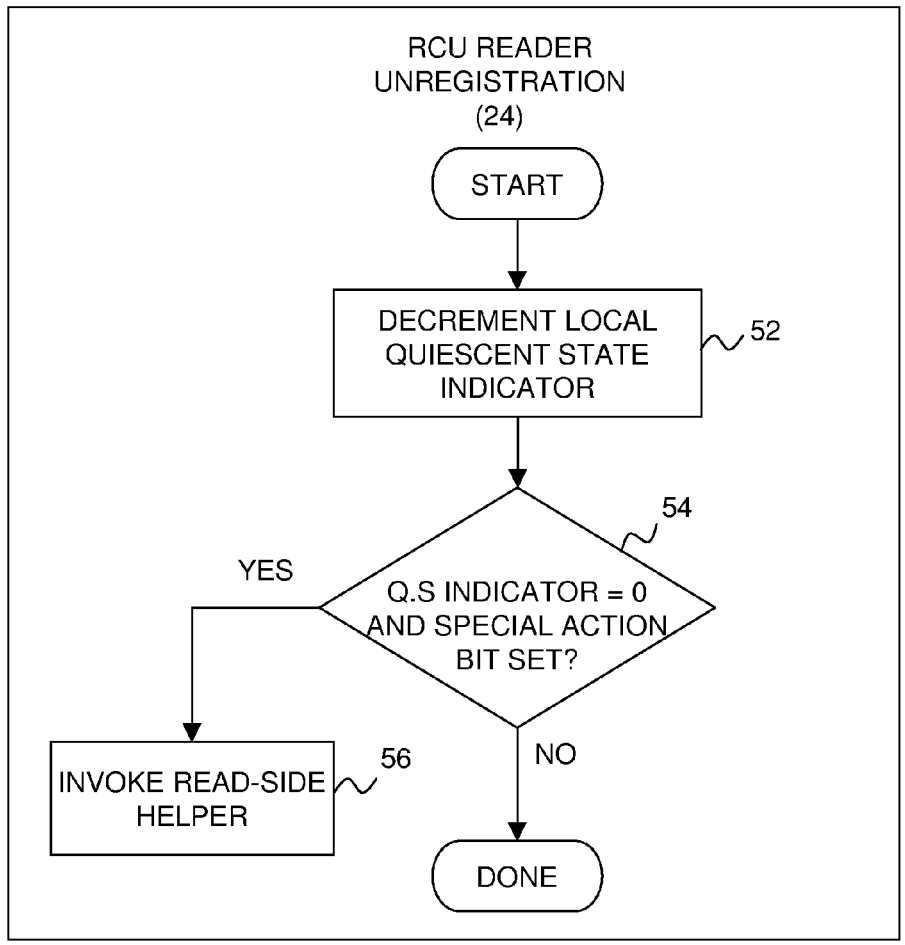
FIG. 10 is a flow diagram illustrating operations that may be performed by an RCU reader unregistration component of the RCU subsystem.

Turning now to FIG. 8, a reference map is shown to illustrate the operational inter-relationships between the various components of the RCU subsystem 20 and the local and non-local variables 30/38 shown in FIGS. 6 and 7. The details of FIG. 8 will be discussed in conjunction with the flow diagrams of FIGS. 9-14, which respectively illustrate the RCU subsystem components.

The RCU reader registration component 22 is illustrated at the left of the top row of functional components shown in FIG. 8. It is called by readers 21 each time they enter an RCU read-side critical section. A function name such as "rcu_read_lock( )" may be used when coding the RCU reader registration component 22 in software. With additional reference now to FIG. 9, the sole operation of the RCU reader registration component 22 is to non-atomically increment the local quiescent state indicator 32, as shown in block 50. It will be seen that there are no locks, atomic instructions, memory barriers or disabling of interrupts or preemption. At most, a compiler directive may be needed prior to block 50 to prevent a compiler from undertaking any code-motion optimizations that would move any code following the call to the RCU reader registration component 22 outside of the RCU read-side critical section. The Linux® kernel barrier( ) directive is an example.

The RCU reader unregistration component 24 is illustrated at the center of the top row of functional components shown in FIG. 8. It is called by readers 21 each time they leave an RCU read-side critical section. A function name such as "rcu_read_unlock( )" may be used when coding the RCU reader unregistration component 24 in software. With additional reference now to FIG. 10, the RCU reader unregistration component 24 implements block 52 in which it non-atomically decrements the local quiescent state indicator 32 that was incremented in block 50 of FIG. 9. In block 54, a compound test is made to determine if the local quiescent state indictor 32 has decremented to zero and if any of the special action flag bits 36 are set. If so, the reader 21 is exiting an outermost RCU read-side critical section (for a nested reader) and special handling is required (such as blocked reader processing or to correct the "bad luck" situation where the reader is always in a quiescent state when sampled by the local quiescent state detector 28B). Processing proceeds to block 56 and the read-side helper 26 is invoked. On the other hand, if it is determined in block 54 that the local quiescent state indicator 32 is not zero, or if no special action flag is set, the RCU reader registration component 24 returns. A non-zero value of the quiescent state indicator 32 means that the reader 21 is ending a nested read operation and no further read-side action is required other than the decrement of block 52. The condition wherein no special action flag is set also means that no further read-side action is required. It will be seen that there are no locks, atomic instructions, memory barriers or disabling of interrupts or preemption. At most, a compiler directive may be needed prior to block 52 to prevent a compiler from undertaking any code-motion optimizations that would move any code prior to the call to the RCU reader unregistration component 24 outside of the RCU read-side critical section.

The read-side helper component 26 is illustrated at the right of the top row of functional components shown in FIG. 8. As just explained, it is called by the RCU unregistration component 24 in block 56. A function name such as "rcu_read_unlock_special( )" may be used when coding the read-side helper component 26 in software. With additional reference now to FIG. 11A, the read-side helper component 26 implements block 60 and returns if it was called from within an NMI (Non-Maskable Interrupt) handler. NMI handler code is typically allowed to contain RCU read-side critical sections. However, NMI handlers cannot be interrupted and thus do not require the services of the read-side helper 26, which deals with reader blocking and the "bad luck" situation where the local quiescent state detector 28B (called by the scheduling clock interrupt handler) always finds a processor 4 in an RCU read-side critical section. Being non-interruptible, NMI handlers should never block within an RCU read-side critical section. Nor should the local quiescent state detector 28B ever find a processor 4 in a non-quiescent state due to an NMI handler being in an RCU read-side critical section. Moreover, the read-side helper 26 disables interrupts (see block 62), and on some systems it may not be safe to disable interrupts in an NMI handler. In block 62, the read-side helper component 26 disables interrupts, which prevents scheduling clock interrupt code from running (either due to an interrupt or due to preemption). Block 64 takes a snapshot of the reader's special action bit field 36 and checks the read_unlock_need_gen flag 36B to see if the local quiescent state detector 28B is complaining about "bad luck" due the reader not indicating quiescence. If so, block 66 resets the read_unlock_need_gen flag 36B and sets the read_unlock_got_gen flag 36C to acknowledge the request. Processing reaches block 68 following block 66 or if the read_unlock_need_gen flag 36B was determined not to be set in block 64. Blocks 68 and 70 cause the read-side helper 26 to restore interrupts and return if it was called from within an interrupt handler. Interrupt handlers need not check the read_unlock_blocked flag 36A (see block 74 of FIG. 11B, discussed below) because it is assumed that the interrupt handlers are not threaded and thus cannot block. Blocks 68 and 70 could be modified to handle environments that use threaded interrupt handlers. Block 72 acquires the blocked reader lock 44.

Figure 11A:
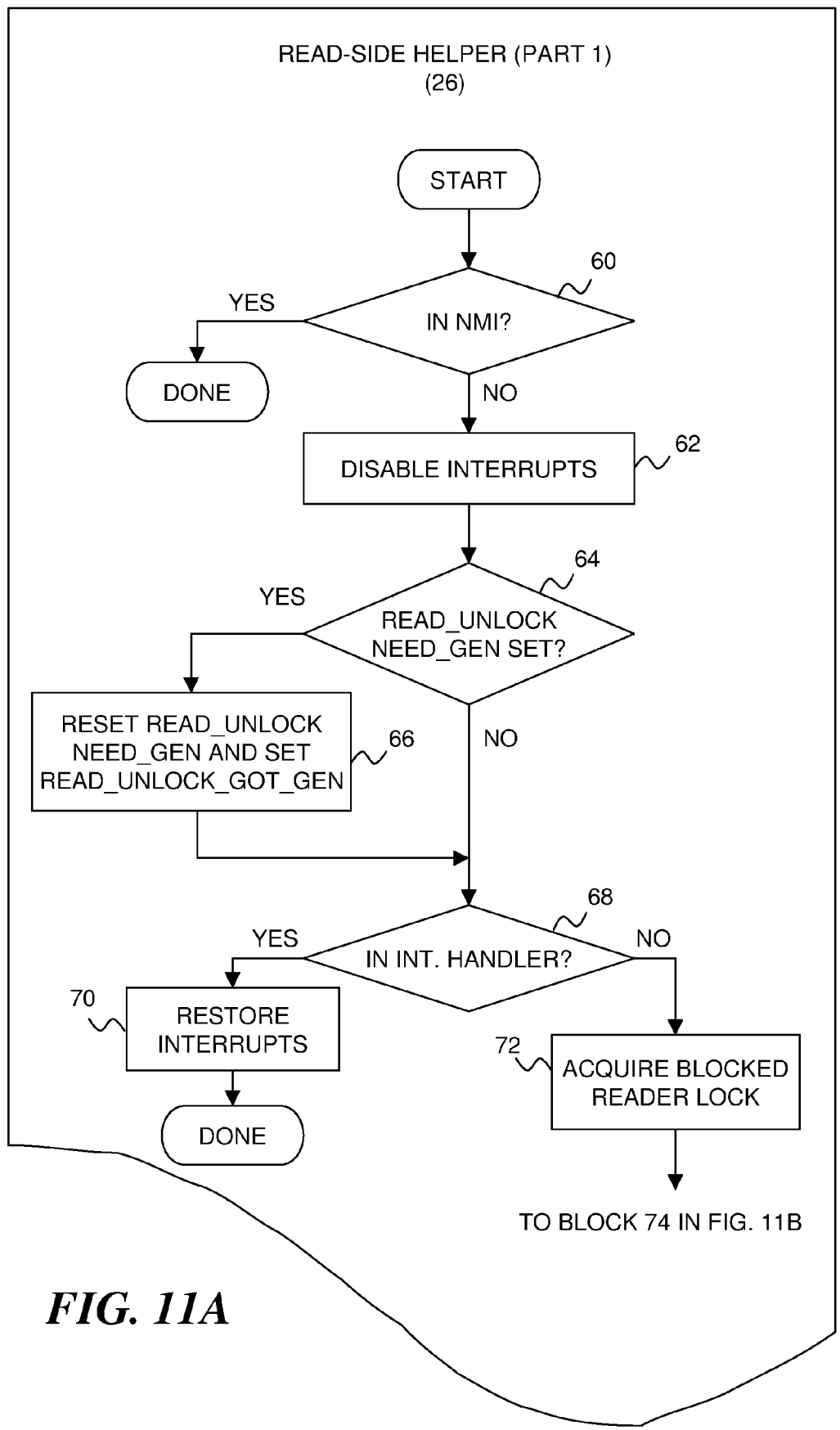
FIG. 11A is a first part of a flow diagram illustrating operations that may be performed by a read-side helper of the RCU subsystem.
Figure 11B:
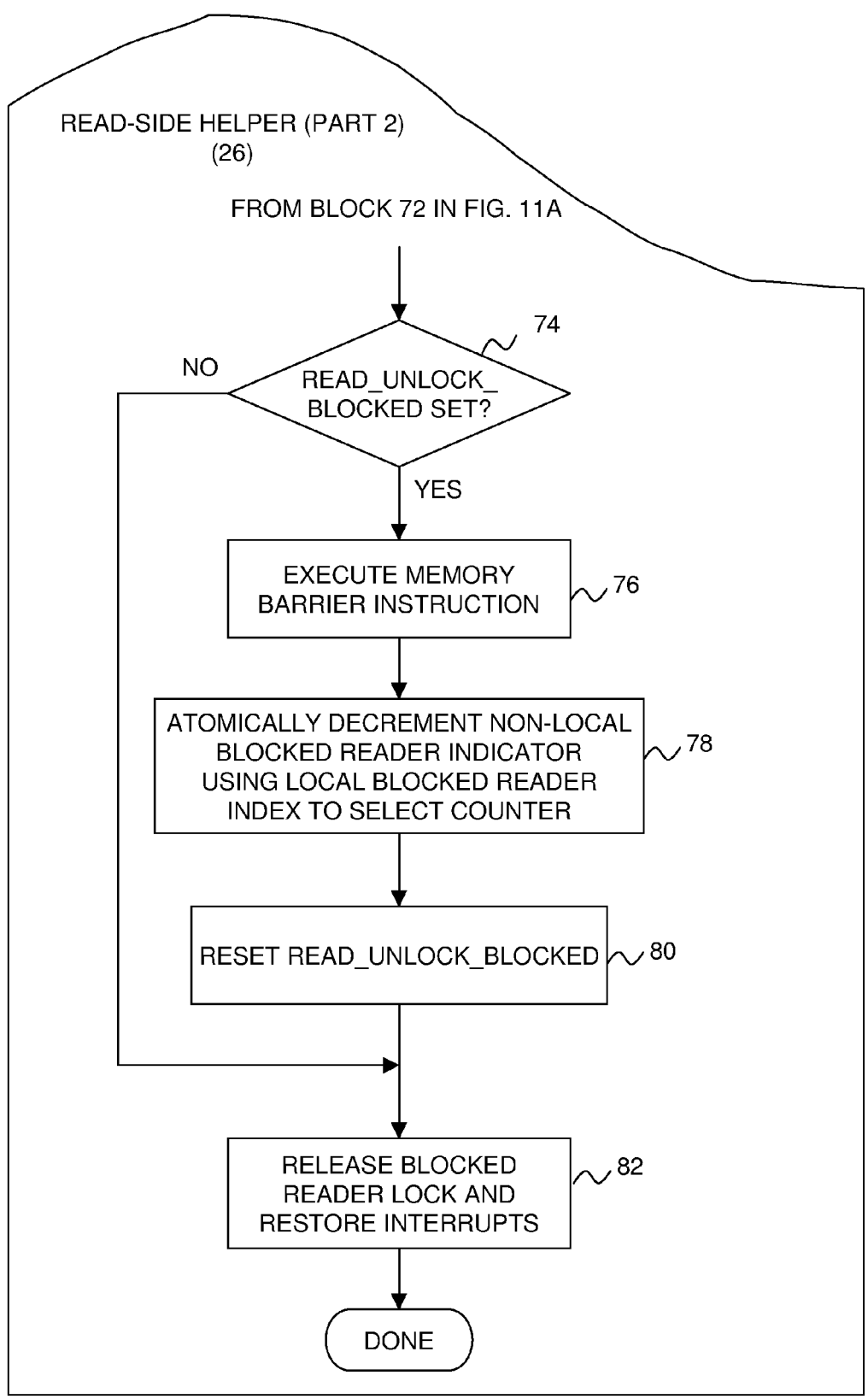
FIG. 11B is a second part of a flow diagram illustrating operations that may be performed by a read-side helper of the RCU subsystem.
Figure 12:
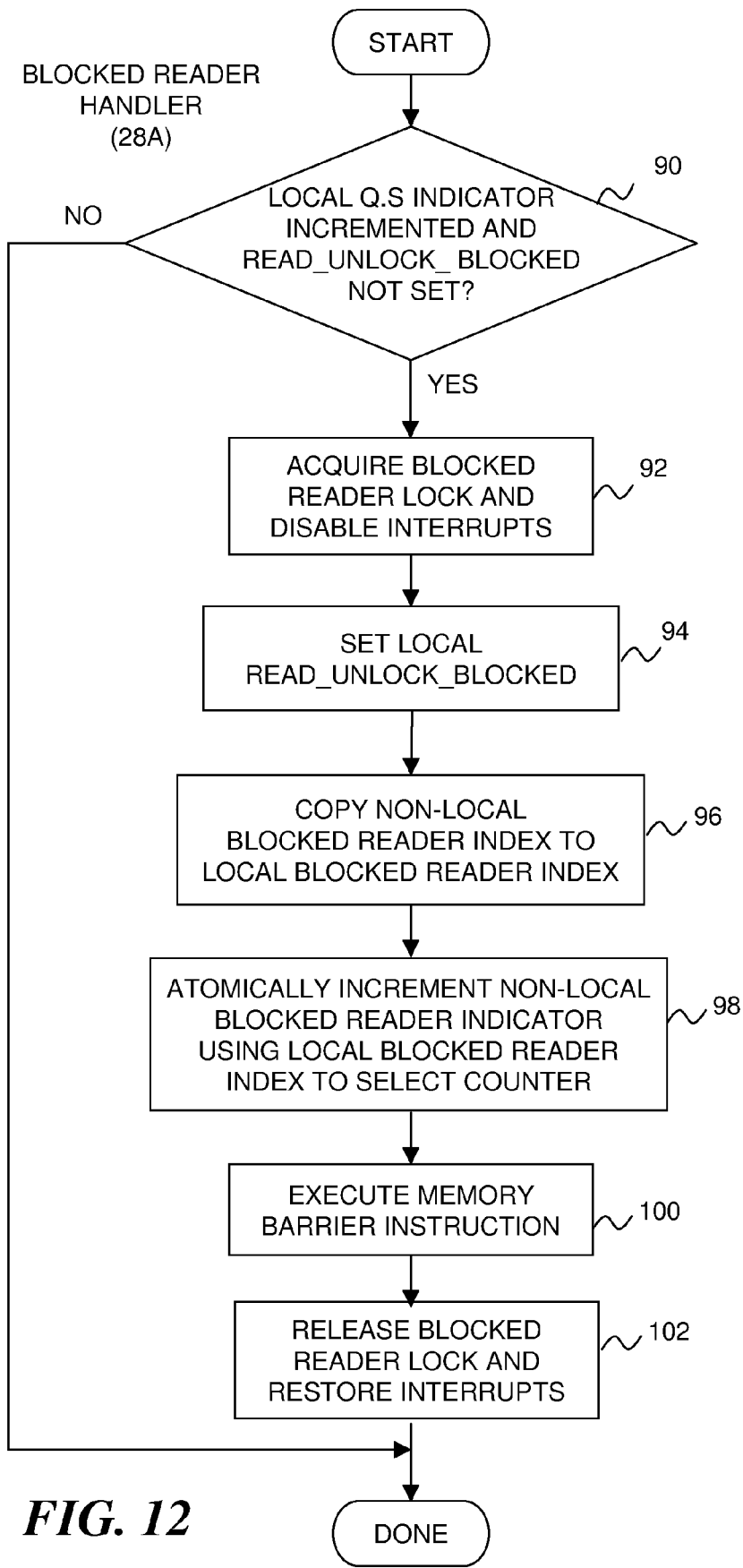
FIG. 12 is a flow diagram illustrating operations that may be performed by a blocked reader handler of the RCU subsystem.
Figure 13:
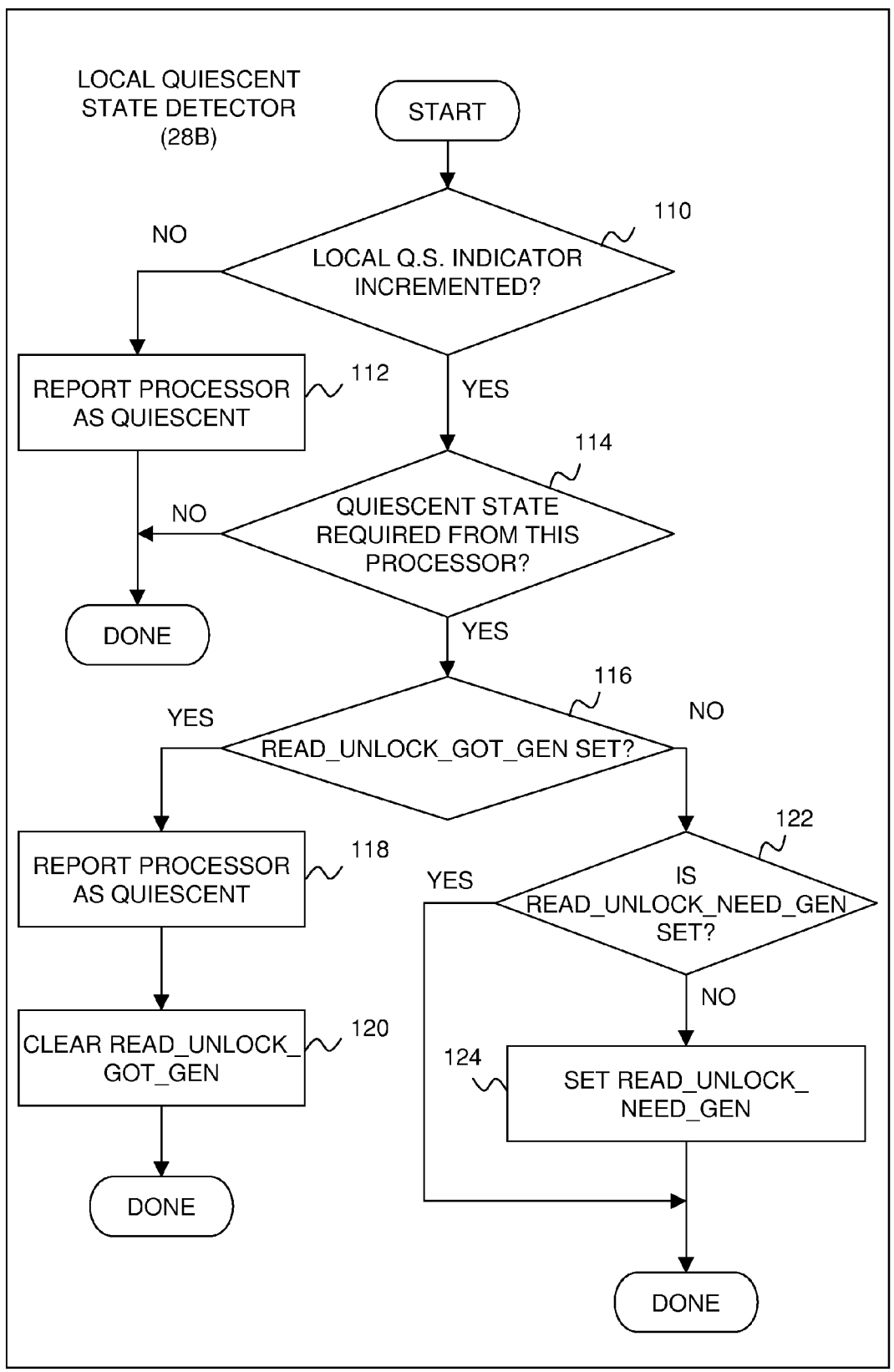
FIG. 13 is a flow diagram illustrating operations that may be performed by a local quiescent state detector of the RCU subsystem.
Figure 14:
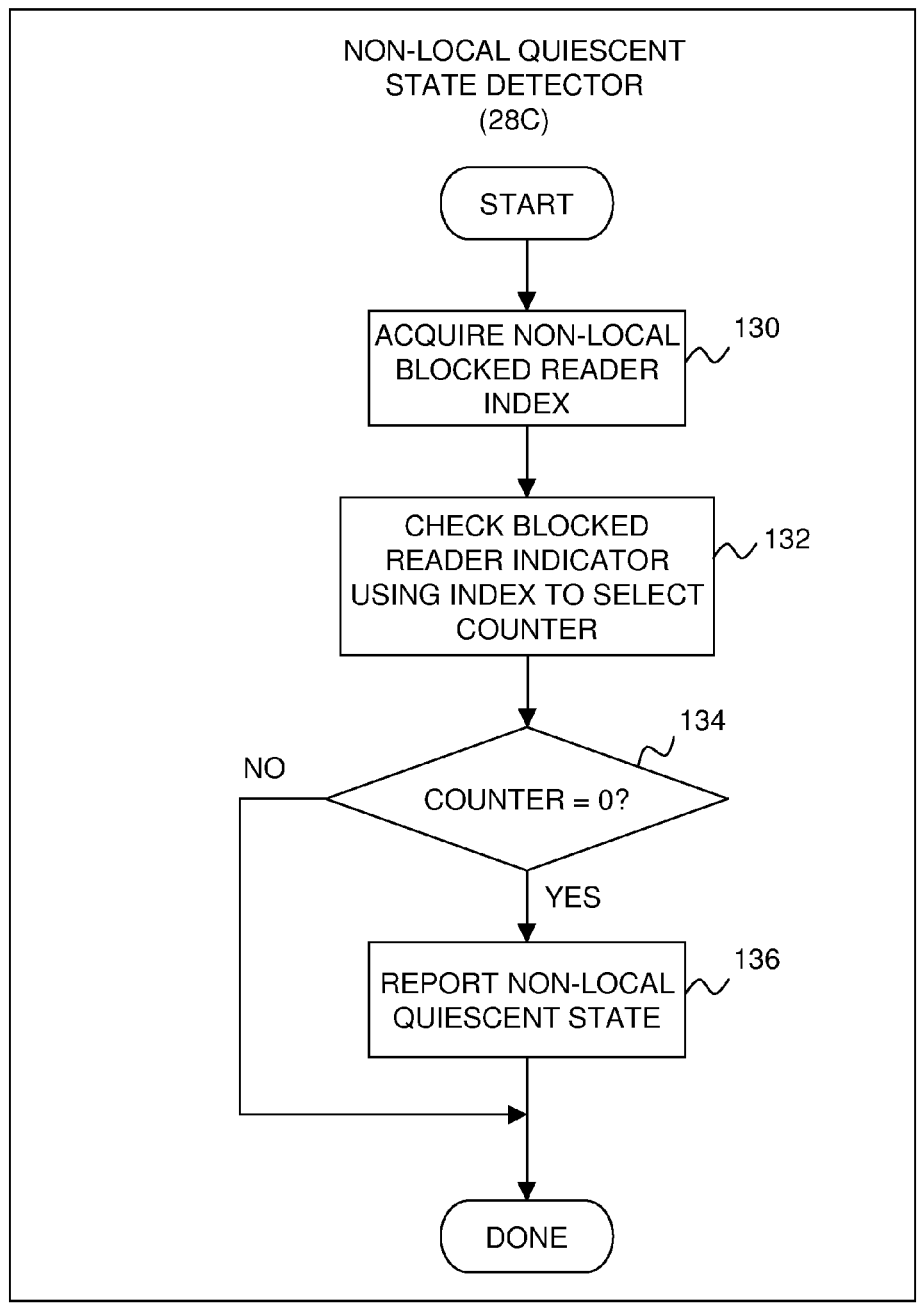
FIG. 14 is a flow diagram illustrating operations that may be performed by a non-local quiescent state detector of the RCU subsystem.

With further reference now to FIG. 11B, block 74 samples the read_unlock_blocked flag 36A to see if the reader blocked inside an RCU read-side critical section. If so, block 76 executes a memory barrier instruction to ensure that the just-ended RCU read-side critical section is seen by all processors 4 to have completed before the subsequent manipulations of non-local state. Block 78 atomically decrements the appropriate counter of the blocked reader indicator 42 using the local blocked reader index 34 to select the appropriate counter. This updates the non-local state to indicate that the RCU read-side critical section has ended. Block 80 then clears the read_unlock_blocked flag 36A. Following block 80, or if the read_unlock_blocked flag 36A was determined not be set in block 74, processing proceeds to block 82. Block 82 releases the blocked reader lock 44 and restores interrupts.

The blocked reader handler 28A is illustrated at the left of the second row of functional components shown in FIG. 8. It is called by the context switch code of the underlying operating system scheduler early in the context switch process. With additional reference now to FIG. 12, the blocked reader handler 28A implements block 90 to check the condition of an outgoing reader 21. In particular, a determination is made whether the local quiescent state indicator 32 is incremented (e.g., greater than zero), indicating that the reader is about to be blocked inside an RCU critical section, and if the read_unlock_blocked flag 36A has not yet been set. If the local quiescent state indicator 32 is not incremented, or if the read_unlock_blocked flag 36A is already set, the blocked reader handler 28A returns. On the other hand, if the conditions of block 90 are met, block 92 acquires the blocked reader lock 44 and disables interrupts. Block 94 sets the reader's read_unlock_blocked flag 36A to arrange for the outermost invocation of the RCU reader registration component 24 for this reader to manipulate the non-local state represented by the blocked reader indicator 42. Block 96 takes a snapshot of the current value of the non-local blocked reader index 40 and copies it to the reader's local blocked reader index 34. Block 98 atomically increments the corresponding counter of the blocked reader indicator 42 (i.e., counter 0 or counter 1). Block 100 executes a memory barrier instruction in order to ensure that the above non-local state manipulation is seen by all processors 4 to have occurred before the ensuing context switch, which might switch to a task that is not in an RCU read-side critical section. Finally, block 102 releases the blocked reader lock 44 and restores interrupts.

The local quiescent state detector 28B is illustrated at the right of the second row of functional components shown in FIG. 8. It is called by the scheduling clock interrupt handler of the underlying operating system. A function name such as "rcu_check_callbacks( )" may be used when coding the local quiescent state detector 28B in software. With additional reference now to FIG. 13, the local quiescent state detector 28B implements block 110 to sample the local quiescent state indicator 32 and see if the current task is in an RCU read-side critical section. If not, the reader's processor 4 is reported to be quiescent in block 112 and the local quiescent state detector returns. There are several ways that a processor 4 may be reported to be quiescent, including by clearing (or setting) a per-processor quiescent state bit in a global RCU control structure, as used in conventional non-preemptive RCU implementations. Alternatively, in a hierarchical RCU implementation (also used for non-preemptive RCU), the per-processor quiescent state bit that is cleared or set could be in a non-global hierarchical node corresponding to a group of processors 4 representing a subset of all the processors in the system. Hierarchical RCU is discussed in more detail below following the discussion of FIG. 14. Other techniques for recording processor quiescent states could also be used.

If the local quiescent state indicator 32 is found to be incremented in block 110, block 114 checks to see if a quiescent state is needed from this processor. This determination can be implemented in various ways, including by checking a per-processor variable that is set for all processors by the RCU subsystem 20 at the beginning of each grace period or when a processor comes on line. If a quiescent state is not required in block 114, the local quiescent state detector 28B returns. If block 114 determines that a quiescent state is required, block 116 checks to see if an earlier setting of the read_unlock_need_gen flag 36B was acknowledged as a result of the current reader setting of the read_unlock_got_gen flag 36B (see block 66 of FIG. 11A). If so, block 118 reports the resulting quiescent state for this processor 4 and block 120 clears the read_unlock_got_gen flag 36C. Block 122 is reached if block 114 determines that the read_unlock_got_gen flag 36C is not set, meaning that a quiescent state is needed from the processor 4, but none has been seen thus far. Block 122 checks to see if a quiescent state request has already been posted by virtue of the read_unlock_need_gen flag 36B being set, and if not, block 124 post such a request by setting this flag. Alternatively, it would be permissible to unconditionally set the read_unlock_need_gen flag 36B in block, 124, thereby eliminating block 122. The local quiescent state detector 28B returns following block 124 or if it is determined in block 122 (assuming block 122 is used) that the read_unlock_need_gen flag 36B is already set.

The global quiescent state detector 28C is the functional component illustrated at the lower right of FIG. 8. It may be called periodically during operation of the system 2, such as when all of the per-processor quiescent state bits used for global quiescent state detection, or a defined level of hierarchical quiescent state detection (see preceding paragraph) have been cleared (or set). A function name such as "cpu_quiet_msk( )" may be used when coding the global quiescent state detector 28C in software. With additional reference now to FIG. 14, the non-local quiescent state detector 28C implements block 130 to check the appropriate counter of the blocked reader indicator 42 that is associated with the current grace period. If the counter is zero or otherwise in a condition that is indicative of a non-local quiescent state (e.g., per-processor, per-processor-group, or global), the non-local quiescent state is reported. This can be done by manipulating an appropriate non-local variable (not shown). On the other hand, the non-local quiescent state detector 28C returns if the checked counter does not indicate a non-local quiescent state (e.g., the counter is non-zero). The non-local quiescent state detector 28C will thereafter run periodically until the non-local state indicates reader quiescence, at which point the current grace period will end. This will allow deferred data updates associated with the grace period to proceed.

Accordingly, a high-performance real-time read-copy update implementation has been disclosed. Advantageously, the disclosed preemptible RCU implementation provides read-side primitives that require no atomic instructions, no memory barriers, no preemption disabling and no interrupt disabling, at least in the common case where a reader is not blocked within an RCU read-side critical section. The read-side primitives also require no loops, so that a sharply bounded sequence of instructions can be executed. On the grace period detection side, the processing overhead is also reduced for the common case, there being no requirement for a state machine or other expensive reader coordination mechanisms. Nor is there any requirement in the common case for the existing modulo counter summation scheme in which per-processor counters must be summed for all processors to detect the end of grace periods.

The foregoing means that a hierarchical grace period detection scheme of the type used for non-preemptible RCU is feasible. Hierarchical grace period detection was mentioned above in connection with block 112 of FIG. 13. Its use could potentially permit preemptible RCU to run efficiently on systems with very large numbers (e.g., thousands) of processors. In hierarchical grace period detection, groups of processors are assigned to rcu_node structures representing leaf nodes in a tree of such nodes. The tree of rcu_nodes is part of a global rcu_state structure. Each rcu_node contains a quiescent state bit mask containing bits that must be cleared to indicate a quiescent state. In the leaf rcu_nodes, each quiescent state bit corresponds to one of the processors assigned to the node. In the non-leaf rcu_nodes, the quiescent state bits correspond to lower level nodes. A quiescent state detection routine known as cpu_quiet_msk( ) samples the quiescent state bits of the various bit maps, working its way up the rcu_node tree from the leaf nodes to the uppermost root node until the bit masks of all rcu_nodes are cleared, thus signifying the end of a grace period.

In order to interface the preemptible RCU technique disclosed herein to hierarchical RCU, the following alterations may be considered:

1. Locate the counter array of the blocked reader indicator 42 into each leaf rcu_node structure. This means that each leaf rcu_node has its own set of counters. The task structure of each reader would then maintain a pointer to the rcu_node whose counter was incremented at the time the corresponding task blocked in an RCU read-side critical section.
2. Add an indicator of which counter to check (e.g., the non-local blocked reader index 40) to the leaf rcu_node structures. The indicator could be a copy of the bottom bit of the rcu_state structure's grace period number field. This would permit the processors 4 to accurately report quiescent states even in the midst of grace-period initialization.
3. Use the rcu_node structure's lock in place of the blocked reader lock 44.
4. Modify the cpu_quiet_msk( ) quiescent state detection routine in hierarchical RCU to implement the non-local quiescent state detector 28C by checking the appropriate counter of the blocked reader indicator 42. The routine could also check the current bitmask field, advancing up the rcu_node hierarchy only if the counter and the bitmask are both zero.

Another advantage of the disclosed technique is that it may be modified for incorporation with real-time RCU implementations that provide priority boosting for preempted readers. Priority boosting can be used to prevent low-priority tasks (which might be preempted by high-priority real-time tasks) from indefinitely postponing the end of a grace period. In that case, the blocked reader handler 28A may designate a reader 21 for priority boosting if the reader will block as a result of a context switch. For this purpose, a pair of boost lists could be maintained that are indexed for associated grace periods (the same as the counters of the blocked reader indicator 42). A separate operating system kernel thread could then periodically run to boost the priority of readers on the boost list. Alternatively, this could be handled in softirq context or potentially by an interrupt handler. The blocked reader handler 28A may designate a reader 21 for priority boosting by adding it to the current boost list. The read-side helper 26 may remove the boosting designation for the reader 21 by removing the reader from the boost list as a result of the reader leaving its RCU read-side critical section. Note that in this priority boosting implementation, it would be possible to use the indexed boost lists as the non-local blocked reader indicator 42 shown in FIG. 8, with each boost list being analogous to one of the counters. A given boost list being empty could be treated equivalently to the analogous counter being zero.

It will be appreciated that the foregoing concepts may be variously embodied in any of a data processing system, a machine implemented method, and a computer program product in which digitally encoded program instructions are stored on one or more computer-readable data storage media for use in controlling a computer or other data processing machine to perform the required functions. The program instructions may be comprise machine language code that is ready for loading and execution by the machine apparatus, or the program instructions may comprise a higher level language that can be assembled, compiled or interpreted into machine language. Example high level languages include, but are not limited to assembly, C, C++, to name but a few. When implemented on a machine comprising a CPU, the program instructions combine with the CPU to provide a particular machine that operates analogously to specific logic circuits, which themselves could be used for the invention.

Figure 15:
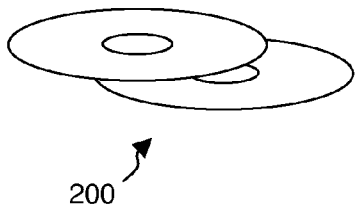
FIG. 15 is a diagrammatic illustration of example media that may be used to provide a computer program product for implementing high performance real-time RCU in accordance with the present disclosure.

Example computer-readable data storage media for storing such program instructions are shown by reference numeral 200 in FIG. 15. The storage media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions of the invention either alone or in conjunction with an operating system or other software product that incorporates the required functionality. The storage media could also be provided by other portable storage media (such as floppy disks, flash memory sticks, etc.), or storage media combined with drive systems (e.g. disk drives), or storage media incorporated in data processing platforms, such as random access memory (RAM), read-only memory (ROM) or other semiconductor or solid state memory. More broadly, the storage media could comprise any tangible electronic, magnetic, optical, electromagnetic, infrared, semiconductor system or apparatus or device. In other embodiments, a computer-readable medium could be provided by a transmission or propagation or signaling medium, or any other entity that can contain, store, communicate, propagate or transport the program instructions for use by or in connection with an instruction execution system, apparatus or device, such as a computer. For all of the above forms of media, when the program instructions are loaded into and executed by an instruction execution system, apparatus or device, the resultant programmed system, apparatus or device becomes a particular machine for practicing embodiments of the methods and systems as described herein.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for reducing reader overhead when referencing a shared data element while facilitating realtime-safe detection of a grace period for deferring destruction of said shared data element, comprising:

said grace period being determined by a condition in which all readers that are capable of referencing said shared data element have reached a quiescent state subsequent to a request for a quiescent state;

performing common case local quiescent state tracking using only local per-reader state information for all of said readers that have not blocked while in a read-side critical section in which said data element is referenced;

performing uncommon case non-local quiescent state tracking using non-local multi-reader state information for all of said readers that have blocked while in said read-side critical section; and said common case local quiescent state tracking requiring less processing overhead than said uncommon case non-local quiescent state tracking.

2. The method of claim 1, wherein said local per-reader state information is maintained by a per-reader quiescent state counter and wherein said non-local state information is maintained by a global, per-CPU, or per-CPU group blocked reader counter.

3. The method of claim 1, wherein said local quiescent state tracking comprises checking said per-reader state information for a currently running reader and designating a processor on which said reader is running as being in a local quiescent state if said per-reader state information indicates that said reader is not in a read-side critical section or that said processor has already passed through a local quiescent state.

4. The method of claim 3, wherein said local quiescent state tracking further comprises determining that a local quiescent state is needed from said processor and manipulating said per-reader state information to request acknowledgment of a local quiescent state.

5. The method of claim 1, wherein said non-local quiescent state tracking comprises checking said non-local multi-reader state information until there are no blocked readers for a particular grace period, and then noting a non-local quiescent state to end said grace period.

6. The method of claim 5, wherein said non-local quiescent state tracking is initiated when said local quiescent state tracking has determined that a group of processors that run said readers have passed through a local quiescent state.

7. A data processing system, comprising:

two or more processors;

a memory operatively coupled to said two or more processors;

said memory including a computer useable medium tangibly embodying at least one program of instructions executable by said processors to perform operations for reducing reader overhead when referencing a shared data element while facilitating realtime-safe detection of a grace period for deferring destruction of said shared data element, said operations comprising:

said grace period being determined by a condition in which all readers that are capable of referencing said shared data element have reached a quiescent state subsequent to a request for a quiescent state;

performing common case local quiescent state tracking using only local per-reader state information for all of said readers that have not blocked while in a read-side critical section in which said data element is referenced;

performing uncommon case non-local quiescent state tracking using non-local multi-reader state information for all of said readers that have blocked while in said read-side critical section; and said common case local quiescent state tracking requiring less processing overhead than said uncommon case non-local quiescent state tracking.

8. The system of claim 7, wherein said local per-reader state information is maintained by a per-reader quiescent state counter and wherein said non-local state information is maintained by a global, per-CPU, or per-CPU group blocked reader counter.

9. The system of claim 7, wherein said local quiescent state tracking comprises checking said per-reader state information for a currently running reader and designating a processor on which said reader is running as being in a local quiescent state if said per-reader state information indicates that said reader is not in a read-side critical section or that said processor has already passed through a local quiescent state.

10. The system of claim 9, wherein said local quiescent state tracking further comprises determining that a local quiescent state is needed from said processor and manipulating said per-reader state information to request acknowledgment of a local quiescent state.

11. The system of claim 7, wherein said non-local quiescent state tracking comprises checking said non-local multi-reader state information until there are no blocked readers for a particular grace period, and then noting a non-local quiescent state to end said grace period.

12. The system of claim 11, wherein said non-local quiescent state tracking is initiated when said local quiescent state tracking has determined that a group of processors that run said readers have passed through a local quiescent state.

13. A computer program product, comprising:
one or more machine-readable storage media;
program instructions stored on said one or more storage media for programming a data processing platform having two or more processors and a memory operatively coupled to said processors;
said program instructions programming said data processing platform to implement operations for reducing reader overhead when referencing a shared data element while facilitating realtime-safe detection of a grace period for deferring destruction of said shared data element, said operations comprising:
said grace period being determined by a condition in which all readers that are capable of referencing said shared data element have reached a quiescent state subsequent to a request for a quiescent state;
performing common case local quiescent state tracking using only local per-reader state information for all of said readers that have not blocked while in a read-side critical section in which said data element is referenced;
performing uncommon case non-local quiescent state tracking using non-local multi-reader state information for all of said readers that have blocked while in said read-side critical section; and
said common case local quiescent state tracking requiring less processing overhead than said uncommon case non-local quiescent state tracking.

14. The computer program product of claim 13, wherein said local per-reader state information is maintained by a per-reader quiescent state counter and wherein said non-local state information is maintained by a global, per-CPU, or per-CPU group blocked reader counter.

15. The computer program product of claim 13, wherein said local quiescent state tracking comprises checking said per-reader state information for a currently running reader and designating a processor on which said reader is running as being in a local quiescent state if said per-reader state information indicates that said reader is not in a read-side critical section or that said processor has already passed through a local quiescent state.

16. The computer program product of claim 15, wherein said local quiescent state tracking further comprises determining that a local quiescent state is needed from said processor and manipulating said per-reader state information to request acknowledgment of a local quiescent state.

17. The computer program product of claim 13, wherein said non-local quiescent state tracking comprises checking said non-local multi-reader state information until there are no blocked readers for a particular grace period, and then noting a non-local quiescent state to end said grace period.

18. The computer program product of claim 17, wherein said non-local quiescent state tracking is initiated when said local quiescent state tracking has determined that a group of processors that run said readers have passed through a local quiescent state.

* * * * *